U. N. BEARDSLEY.
Gate.
No. 66,778. Patented July 16, 1867.
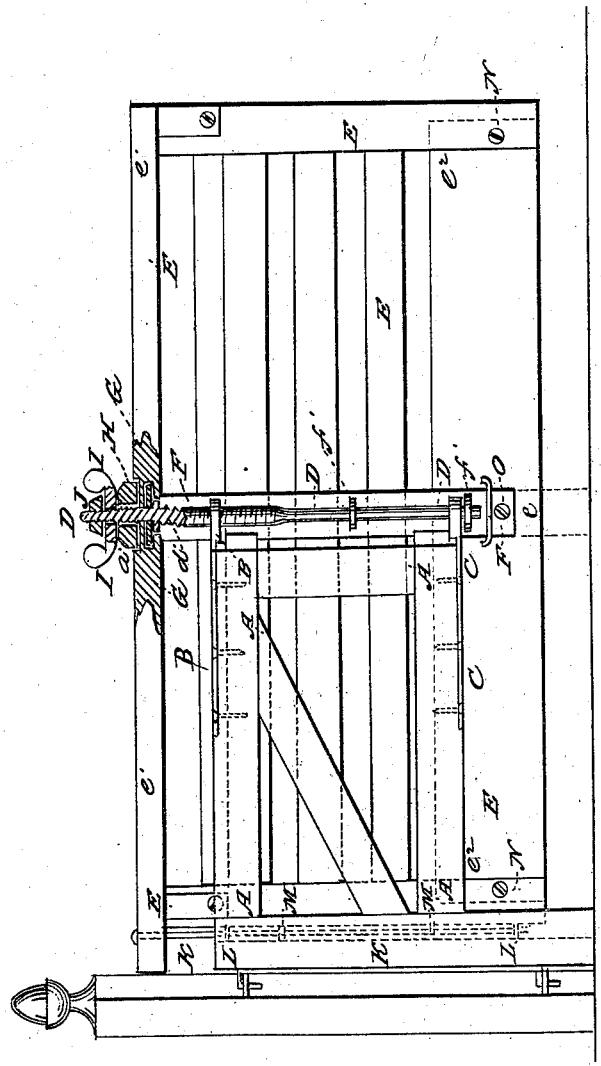
WITNESSES:
INVENTOR:

United States Patent Office.

UDNEY N. BEARDSLEY, OF GOSHEN, INDIANA.

Letters Patent No. 66,778, dated July 16, 1867.

IMPROVEMENT IN GATES.

*The Schedule referred to in these Letters Patent and making part of the same.*

TO ALL WHOM IT MAY CONCERN:

Be it known that I, UDNEY N. BEARDSLEY, of Goshen, in the county of Elkhart, and State of Indiana, have invented a new and useful Improvement in Gates; and I do hereby declare that the following is a full, clear, and exact description thereof, which will enable others skilled in the art to make and use the same, reference being had to the accompanying drawings forming part of this specification.

The figure is a side view of my improved gate, part of the cap being broken away to show the construction.

My invention has for its object to furnish an improved gate so constructed that the entire weight of the gate may be brought within five or six feet of the hinges, and which may be so adjusted as to swing clear of the mud or snow that would clog an ordinary gate; and it consists in the construction of the small and large gates, and in the manner in which they are combined with each other.

A is the small gate, the rear vertical cross-bar of which is hinged to the gate-post in the ordinary manner, as shown in red lines in the drawing. The gate A is a frame, and to its upper and lower horizontal bars are attached the iron arms B and C, having holes formed through their projecting ends for the passage of the bar or rod D by which the large gate E is hung or pivoted to the outer end of the gate A. The hole through the upper arm B has a screw-thread cut in it fitting into the screw-thread cut upon the upper part of the rod D, as shown in the figure. E is the large gate, which is made of the proper size to close the gateway. F is an iron bar or plate extending vertically across the middle part of the gate, and from which project two or more eyes $f'$ for the reception of the rod D. The rod D passes up through the cap $e^1$ of the gate, and has a collar, $d'$, formed solidly upon it, which by pressing against the notched or slotted slide G, placed in a slot in the cap $e^1$, prevents the rod D from moving upward. The rod D is kept from moving downward by the collar H placed upon the rod D above the cap $e^1$, and kept in place by the thumb-piece I and nut J. The thumb-piece I has a square hole formed through it fitting upon a squared part of the rod D, so that by turning the thumb-piece I the rod D will be revolved and the gate E raised or lowered, as desired. The rear end of the gate E is secured to the rear end of the gate A by a rod, K, passing down through a hole in the rear part of the cap $c^1$ and through eye-bolts L and M attached to the rear vertical bars of the gates A and E, as shown in dotted lines in the drawing. The rod K simply connects the rear ends of the gates A and E, and does not support any of the weight of the gate E, its whole weight being supported by the rod D. The gate E being suspended from its middle part does not require, and is made without, brace-bars. The ends of the lower or bottom board $e^2$ of the gate E enter slots in the vertical end bars of said gate, and are secured in place by the bolts N passing through the said end bars and the ends of the said bottom board, and by the bolt O passing through the lower end of the bar or plate F and through the said bottom board. By this construction the bottom board $e^2$ can be removed when desired, leaving an open space at the lower part of the gate, so that small stock may be allowed to pass through while the passage of the larger stock will be prevented by the upper part of the gate. By securing the forward end of the gate A to a short post (shown in red lines in the drawing) set in the ground, and removing the rod K, the gate E may be used as a small gate, if desired.

What I claim as new, and desire to secure by Letters Patent, is—

1. Pivoting the large gate E at its middle part to the forward end of the small gate A, the rear end of which is hinged to a gate-post in the ordinary manner, substantially as herein shown and described and for the purpose set forth.

2. The combination of the arms B and rod C with the gates A and E, substantially as herein shown and described and for the purpose set forth.

3. The combination of the rod K with the rear ends of the gates A and E, substantially as herein shown and described and for the purpose set forth.

4. Securing the bottom board $e^1$ of the gate E removably in place by the bolts N and O, substantially as herein shown and described and for the purpose set forth.

UDNEY N. BEARDSLEY.

Witnesses:
    W. NASH,
    G. LATTA.